United States Patent
Frenger et al.

(10) Patent No.: US 9,763,258 B2
(45) Date of Patent: Sep. 12, 2017

(54) METHOD AND ARRANGEMENT FOR COMMUNICATION USING A DYNAMIC TRANSMISSION PARAMETER

(71) Applicant: Telefonaktiebolaget L M Ericsson (publ), Stockholm (SE)

(72) Inventors: Pål Frenger, Linköping (SE); Erik Eriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 14/762,054

(22) PCT Filed: Jan. 21, 2013

(86) PCT No.: PCT/SE2013/050034
§ 371 (c)(1),
(2) Date: Jul. 20, 2015

(87) PCT Pub. No.: WO2014/112907
PCT Pub. Date: Jul. 24, 2014

(65) Prior Publication Data
US 2015/0358983 A1    Dec. 10, 2015

(51) Int. Cl.
*H04W 4/00* (2009.01)
*H04W 72/08* (2009.01)
(Continued)

(52) U.S. Cl.
CPC ......... *H04W 72/085* (2013.01); *H04L 1/0006* (2013.01); *H04L 27/2666* (2013.01)

(58) Field of Classification Search
CPC . H04W 72/085; H04L 1/0006; H04L 27/2666
See application file for complete search history.

(56) References Cited

U.S. PATENT DOCUMENTS

| | | | |
|---|---|---|---|
| 2007/0155387 A1* | 7/2007 | Li | H04L 27/2602 455/441 |
| 2007/0159959 A1* | 7/2007 | Song | H04L 5/0048 370/208 |

(Continued)

OTHER PUBLICATIONS

3GPP TSG RAN WG1 Meeting #43; Seoul, Korea; Title: Adaptive sub carrier spacing for OFDM downlink; Source: Fujitsu (R1-051378), Nov. 7-11, 2005.

(Continued)

*Primary Examiner* — Abdelnabi O Musa
(74) *Attorney, Agent, or Firm* — Baker Botts, LLP

(57) ABSTRACT

Base station and User Equipment (UE) and methods to be performed therein for communication using a dynamic transmission parameter. The method to be performed in a base station comprises scheduling of transmission resources to a UE in an OFDM symbol associated with a dynamic parameter value. The base station is assumed to be associated with a carrier where a radio frame comprises at least one OFDM symbol associated with a fixed parameter value and at least one OFDM symbol associated with a dynamic parameter value, where the parameter is a cyclic prefix, CP, or a subcarrier spacing, $\Delta f$. The method further comprises determining a value of the parameter based on a characteristic of a radio link associated with the UE, and applying the determined value of the parameter when communicating with the UE in the scheduled transmission resources.

30 Claims, 12 Drawing Sheets

(51) Int. Cl.
    *H04L 1/00*      (2006.01)
    *H04L 27/26*     (2006.01)

(56) References Cited

U.S. PATENT DOCUMENTS

2009/0270122 A1* 10/2009 Chmiel .............. H04L 27/2607
                                                    455/550.1
2012/0281551 A1* 11/2012 Alanara ............. H04L 27/2607
                                                    370/252

OTHER PUBLICATIONS

3GPP TSG RAN WG4 Meeting #42; St. Louis, Missouri; Title: LS on Added Support for 7.5 kHz Subcarrier Spacing; Source: RAN1 (Tdoc R4-070017), Feb. 12-16, 2007.

International Search Report for International application No. PCT/SE2013/050034, Jul. 19, 2013.

\* cited by examiner

METHOD AND ARRANGEMENT FOR COMMUNICATION USING A DYNAMIC TRANSMISSION PARAMETER

PRIORITY

This nonprovisional application is a U.S. National Stage Filing under 35 U.S.C. §371 of International Patent Application Serial No. PCT/SE2013/050034, filed Jan. 21, 2013, and entitled "Method And Arrangement For Communication Using A Dynamic Transmission Parameter."

TECHNICAL FIELD

The herein suggested technology relates generally to communication between two nodes in a wireless communication system using a dynamic transmission parameter.

BACKGROUND

Orthogonal frequency division multiplexing (OFDM) is the downlink modulation format used in the 3GPP Long term evolution (LTE) standard. An OFDM symbol with a duration of $T_u$ consists of many sub-carriers, each having a sub-carrier spacing of $\Delta f=1/T_u$. The number of sub-carriers $N_c$ and the sub-carrier spacing determines the overall transmission bandwidth of the OFDM signal which can be approximated as $BW \approx N_c \times \Delta f$. In order to maintain sub-carrier orthogonality in time dispersive channels, each OFDM symbol is prefixed with a cyclic extension of duration $T_{cp}$. The total duration of an OFDM symbol then becomes $T_{tot}=T_u+T_{cp}$. In principle, the cyclic prefix (CP) length should cover the maximum length of the expected time dispersion of the channel. However, the CP represents an overhead cost and hence it is also beneficial to keep it as short as possible.

In LTE, two CP durations are defined. A so-called "normal" (shorter) CP is defined to be suitable for small and medium cell environments. A so-called "extended" (longer) CP is also defined to be used in environments with extreme time dispersion, especially in the cases of single frequency network (SFN) operation or Coordinated Multi-Point transmission (CoMP) operation. A longer CP provides more robustness towards channel delay spread at the cost of more overhead. The LTE frame structure is illustrated in FIG. 1a. The normal and extended CPs defined within LTE are also illustrated in FIG. 1a. Further, a principle for deriving a CP is illustrated in FIG. 1b. FIG. 2 shows a number of sub-carriers, and illustrates the sub-carrier spacing discussed herein.

Regardless of the CP duration used, the basic time structure in LTE is unchanged. A 10 ms radio frame consists of 10 sub-frames regardless of the CP duration, as illustrated in FIG. 1a. The different CP durations are seen when examining how many OFDM symbols that fit into a 1 ms sub-frame. A normal CP sub-frame contains 14 symbols (7 per slot) while an extended CP sub-frame contains 12 symbols (6 per slot). The CP duration of an LTE carrier is blindly decoded by the UE as part of the cell search procedure.

In the standardization forum 3GPP LTE Rel-12, discussions are ongoing at the moment to define a new carrier type (NCT). Even though it is not yet defined what the NCT will end up becoming, one likely characteristic is that it will contain mandatory transmissions only in sub-frames 0 and 5. In all other sub-frames, a base station that does not transmit any user data will not transmit anything at all, i.e. not even reference signals. This reduces the interference from reference signals, also known as pilot pollution and it enables the base station to save energy by means of discontinuous transmission (DTX).

In OFDM the CP duration should reflect the maximum expected delay spread of a carrier. All users that attach to a cell will determine the CP duration of the cell blindly.

A large CP may be required in case the channel has a large maximum delay spread, in order to prevent that system performance will be degraded by inter-symbol and inter-carrier interference.

It is realized by the inventors that with current state-of-the-art solutions, an unnecessarily long CP is used in many situations, in order to support UEs associated with large delay spread. However, for many UEs, which do not experience a large delay spread, this long CP degrades the performance.

SUMMARY

The herein suggested technology obviates at least some of the drawbacks described above and enables use of adequate parameter values, per UE, in communication between a network node and a number of UEs. This is achieved by enabling use of UE-specific parameter values in dynamic transmission resources.

According to a first aspect, a method to be performed in a base station is provided. The method comprises scheduling of transmission resources to a UE in an OFDM symbol associated with a dynamic parameter value. The base station is associated with a carrier where a radio frame comprises at least one OFDM symbol associated with a fixed parameter value and at least one OFDM symbol associated with a dynamic parameter value, where the parameter is a cyclic prefix, CP, or a subcarrier spacing, $\Delta f$. The method further comprises determining a value of the parameter based on a characteristic of a radio link associated with the UE, and applying the determined value of the parameter when communicating with the UE in the scheduled transmission resources.

According to a second aspect, a base station is provided for use in a wireless communication network. The base station is operable to be associated with a carrier where a radio frame comprises at least one OFDM symbol associated with a fixed parameter value and at least one OFDM symbol associated with a dynamic parameter value, where the parameter is a Cyclic Prefix, CP, or a subcarrier spacing, $\Delta f$. The base station comprises a scheduler operable to schedule transmission resources to a UE in an OFDM symbol associated with the dynamic parameter value. The base station further comprises a determining unit, adapted to determine a value of the parameter for the UE based on a characteristic of a radio link associated with the UE, and a control unit, adapted to apply the determined value of the parameter when communicating with the UE in the scheduled transmission resources.

According to a third aspect, a method to be performed by a UE is provided. The UE is assumed to be served by a base station associated with a carrier where a radio frame comprises at least one OFDM symbol associated with a fixed parameter value and at least one OFDM symbol associated with a dynamic parameter value, where the parameter is a Cyclic Prefix, CP, or a subcarrier spacing, $\Delta f$. The method comprises applying a first parameter value when communicating with the base station in a first OFDM symbol associated with the dynamic parameter value. The method further comprises determining a parameter value for communication with the base station based on an indication from the base station and/or a characteristic of a radio link associated with the UE. The method further comprises, when a determined second parameter value fulfills a criterion in relation to the first parameter value, applying the second parameter value when communicating with the base station in a second OFDM symbol associated with the dynamic parameter value.

According to a fourth aspect, a UE is provided for use in a wireless communication network. The UE is operable to be served by a base station associated with a carrier where a radio frame comprises at least one OFDM symbol associated with a fixed parameter value and at least one OFDM symbol associated with a dynamic parameter value, where the parameter is a Cyclic Prefix, CP, or a subcarrier spacing, $\Delta f$. The UE comprises a control unit adapted to apply a first parameter value when communicating with the base station in a first OFDM symbol associated with the dynamic parameter value. The UE further comprises a determining unit, adapted to determine a parameter value for communication with the base station based on an indication from the base station and/or a characteristic of a radio link associated with the UE. The control unit is further adapted to apply the second parameter value when communicating with the base station in a second OFDM symbol associated with the dynamic parameter value, when a determined second parameter value fulfills a criterion in relation to the first parameter value.

An advantage of the technology suggested herein is that waste of transmission resources may be avoided. For example, the use of an extended CP may be avoided when it is not needed. Thereby, an increased data rate may be provided for mobile terminals. Further, the herein suggested technology enables a robust operation associated e.g. with extended CP, when needed, without degrading performance of users for which e.g. a normal CP is sufficient.

Further, the herein suggested technology enables Downlink (DL) CoMP, e.g. in situations when an extended CP is needed when a UE is to receive coordinated data transmissions from several different base stations.

Further, the herein suggested technology enables e.g. efficient SFN (Single Frequency Network) transmission of e.g. system information and paging, using an extended CP, while normal user plane related data transmissions can use normal CP.

The herein suggested technology enables adaptation of CP and/or subcarrier spacing, $\Delta f$, on a finer granularity than two levels. For example, the CP length can be selected individually for each user.

Further, the herein suggested technology allows that UEs that are capable of performing a computationally complex channel equalization processing may be assigned a shorter CP prefix. Hence, it is possible to trade receiver complexity against throughput in a more flexible way than today.

Further, the herein suggested technology enables shared frequency HetNet deployments where different CP durations may be used in the high power nodes as compared to the low power nodes.

BRIEF DESCRIPTION OF THE DRAWINGS

The above, as well as additional objects, features and advantages of the suggested technology, will be better understood through the following illustrative and non-limiting detailed description of embodiments, with reference to the appended drawings, in which:

FIGS. 5b-5d show exemplifying signaling schemes illustrating variants of the procedure illustrated in FIG. 5a.

DETAILED DESCRIPTION

Since there is an additional cost associated with using an extended CP, such a CP should only be used when it is suitable, or required, in regard of channel conditions. But even in cells where some UEs require an extended CP, there are typically many UEs for which the extended CP provides no benefit. These UEs would, in fact, get better performance in case the carrier operated with a normal CP. But, use of a normal CP would leave the carrier useless for UEs with large time dispersion.

Herein, a solution is suggested, which is applicable e.g. in association with the new carrier type, NCT, e.g. when transmission is only mandatory in sub-frames 0 and 5 in such an NCT.

Below, an example will be described where it is assumed that transmission is mandatory in certain LTE sub-frames. In order to link to the supposed characteristics of the NCT, mandatory transmission is assumed in sub-frames 0 and 5 of an LTE frame in the examples below. However, this should only be regarded as an example. Further, the examples below mostly relate to selection of CP duration on a sub-frame level (per sub-frame). However, as will be described further below, embodiments of the herein suggested technology may involve e.g. selection of CP duration on an OFDM symbol level (per OFDM symbol), and also selection of sub-carrier spacing, $\Delta f$, on a sub-frame level or OFDM symbol level.

EXAMPLE

LTE sub-frames, in which transmission is mandatory, should be associated with a fixed CP duration. For example, sub-frames 0 and 5 in a NCT carrier. By "fixed" is here meant that this CP duration should not vary e.g. between corresponding sub-frames in different radio frames, but be the same. Using sub-frames 0 and 5 as an example, these sub-frames should be associated with the same CP duration in a first radio frame and a second radio frame. These sub-frames configured to be associated with a fixed CP duration may be blindly decoded by a receiving node, such as a UE in a cell. That is, UEs may be configured to autonomously determine which CP duration that is used for these sub-frames, and then apply the determined CP duration. All other sub-frames (i.e. all except the one or ones associated with a fixed CP duration) could be configured to be associated with a dynamic CP duration. By "dynamic", is meant that the CP duration used in these sub-frames could vary e.g. between radio frames. For example, in such "dynamic" sub-frames, either a normal or an extended sub-frame CP duration/length can be used for communication between a UE and an eNB.

Figure 1A:
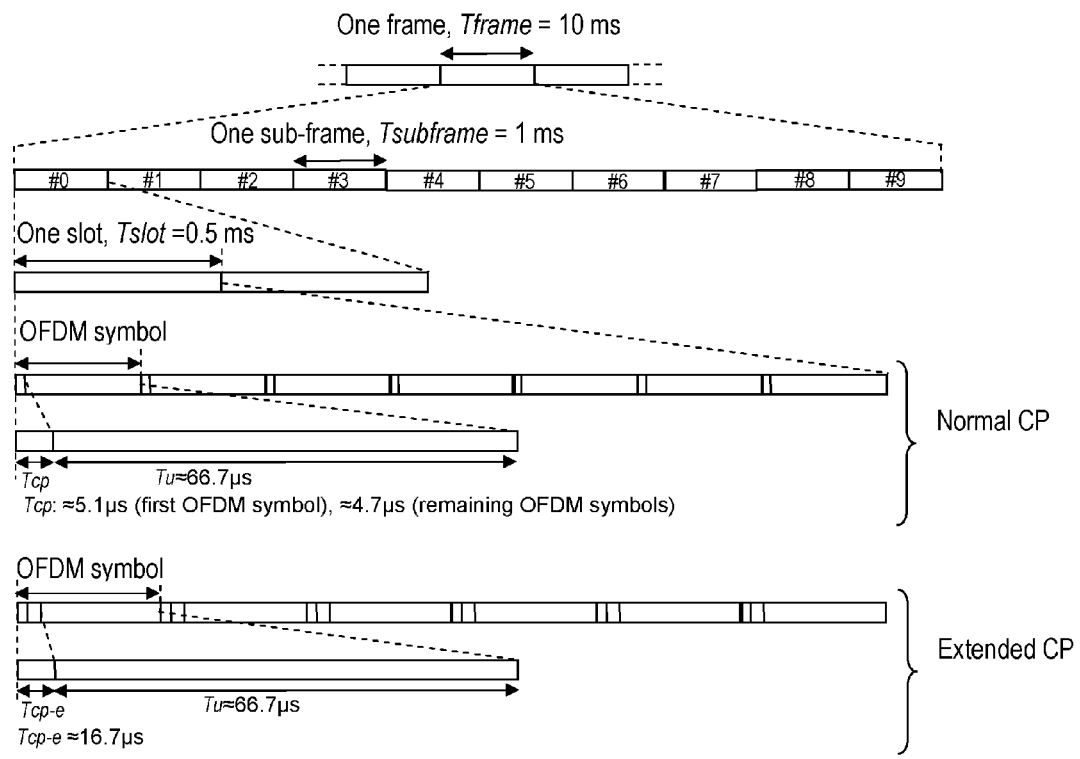
FIG. 1a illustrates the frame structure in an LTE-type system, and a so-called "normal" CP and an "extended" CP, according to the prior art.
Figure 1B:
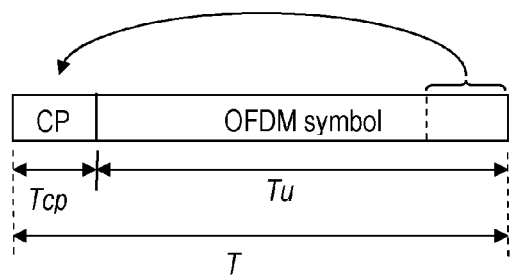
FIG. 1b illustrates generation of a CP, according to the prior art.
Figure 2:
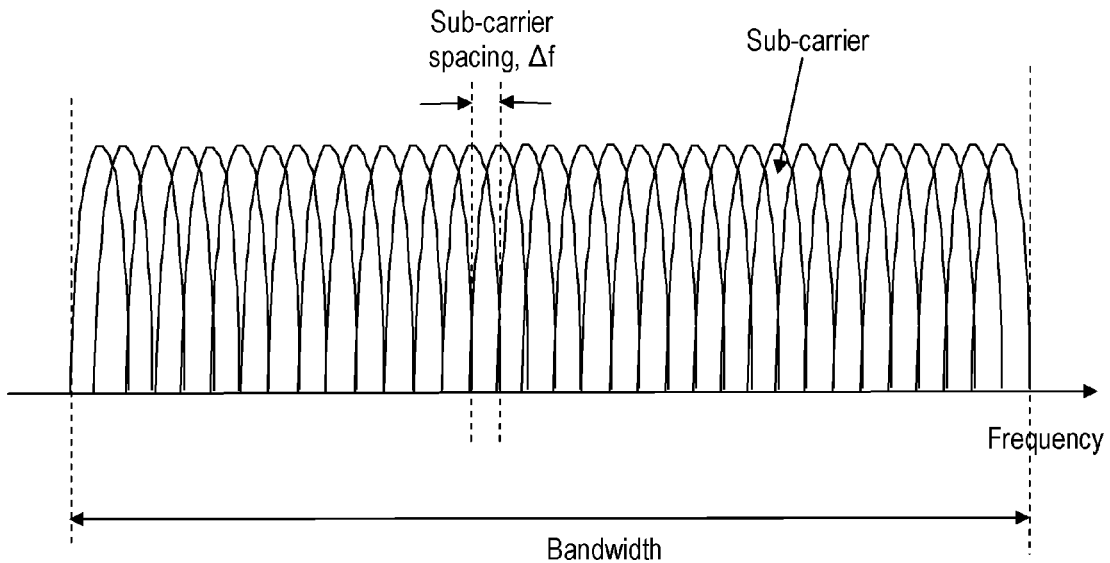
FIG. 2 illustrates sub-carrier spacing, $\Delta f$, according to the prior art.
Figure 3:
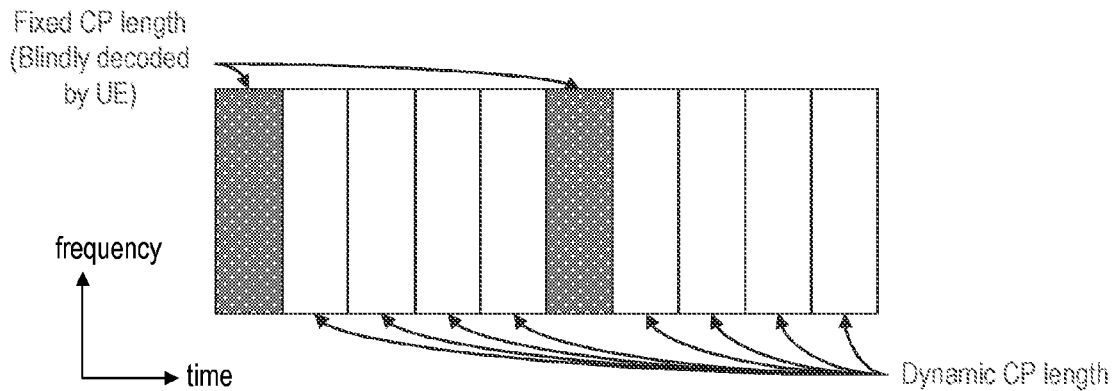
FIG. 3 shows a time/frequency configuration of one LTE radio frame (10 ms) consisting of 10 sub-frames (1 ms each), where sub-frames 0 and 5 have a fixed CP duration while the other sub-frames have a variable CP duration, according to an exemplifying embodiment.

FIG. 3 illustrates an LTE radio frame where an exemplifying embodiment of the suggested technology may be applied. FIG. 3 shows a time/frequency configuration of one LTE radio frame (10 ms) consisting of 10 sub-frames of 1 ms each, where sub-frames 0 and 5 are associated with, or configured for, a fixed CP duration, while the other sub-frames are associated with, or configured for, a variable, or "dynamic" CP duration. Sub-frames associated with a fixed CP duration will henceforth be referred to as "fixed sub-frames" or "fixed CP sub-frames", and sub-frames associated with variable CP duration will be denoted "dynamic sub-frames" or "dynamic CP sub-frames". In a similar manner such terms can be applied for sub-carrier spacing.

The CP duration to be used in the dynamic CP sub-frames may be signaled to concerned parties by use of dedicated RRM (Radio Resource Management) messages transmitted in the fixed CP sub-frames. Once a UE is scheduled in a dynamic CP sub-frame, it should use the CP duration indicated in the RRM message. Different UEs may be associated with different CP durations, and the CP duration associated with a UE may change, e.g. as the UE moves around in a cell. In case another CP than the indicated one is used by the base station in that sub-frame, the UE will not be able to decode anything in the sub-frame. However, that is not a problem, since this implies that the base station did not address that UE in this particular sub-frame and hence there was nothing for that UE to decode anyway.

In order to handle situations where a UE has not yet determined or been provided with a CP configuration, which it is expected to use for communication in dynamic sub-frames in a radio frame, it would be possible to define a default CP configuration. A default CP configuration could e.g. be such that sub-frames that may have a different CP than the fixed CP sub-frames (i.e. the dynamic sub-frames) have the same CP as the fixed CP sub-frames until the UE receives an indication of that some other CP should be used. Alternatively, a default CP configuration could be explicitly signaled via a system broadcast channel.

One reason for defining that a certain sub-frame should be associated with a fixed CP duration is to support multi-cast and broadcast services (MBS). Typically MBS is transmitted in single frequency network (SFN) format, which most often requires an extended CP. Thus, MBS could, with advantage, be transmitted in sub-frames associated with a fixed extended CP duration. A UE that is configured to use a normal CP in dynamic sub-frames would then use an extended CP if it is scheduled in a sub-frame used for e.g. multi-cast broadcast single frequency network (MBSFN) services.

In case of heterogeneous networks it might be beneficial to use different CP durations in different cells. For example, a high power node such as a macro base station will have a much larger coverage area than a low power node such as a pico base station. Consequently, the signals from a high power node may experience much larger time dispersion as compared to the signals from the low power node. In such scenarios we may want to deploy a macro cell (high power node) with an extended CP and a pico cell (low power node) with a normal CP. In case the macro and the pico cell operate in different frequency bands (i.e. the macro operates in a different frequency band than the pico and vice versa), there are no problems associated with the use of different CP durations in the macro and pico layers (cells). But, when the same frequency band is used in the macro and the pico layers, then the use of some coordination method could greatly reduce the interference between the two network layers.

Figure 4:
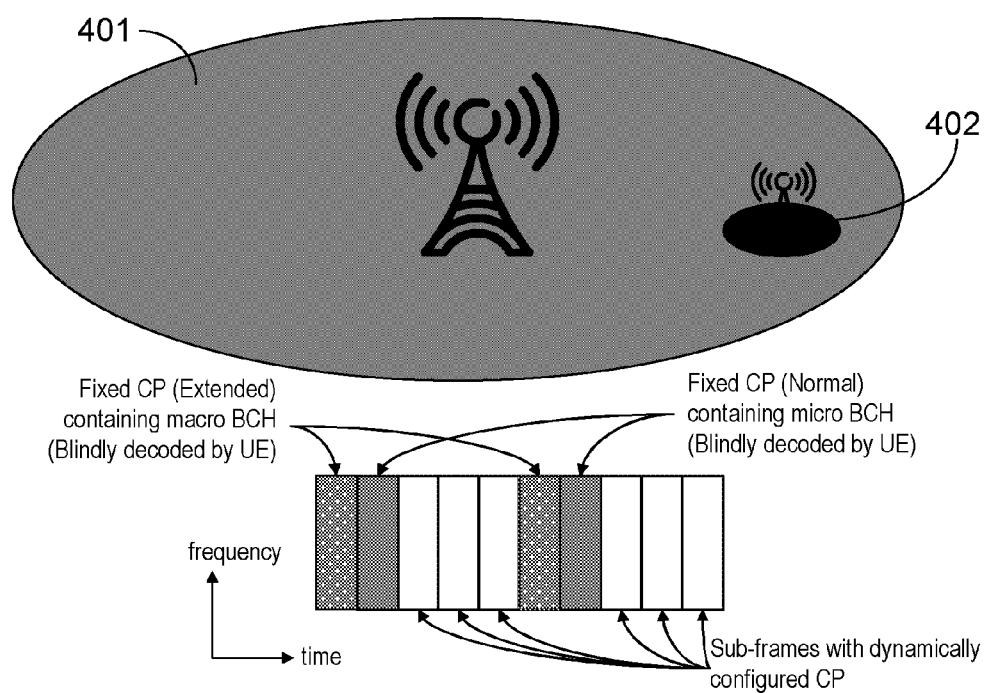
FIG. 4 shows an exemplifying embodiment in a HetNet scenario.

Such coordination can be achieved e.g. by introducing a time-shift between the two layers, as depicted in FIG. 4. In the example depicted in FIG. 4, the macro cell 401 uses a fixed extended CP in sub-frames 0 and 5 while the pico cell 402 uses a fixed normal CP in sub-frames 1 and 6. Note that this numbering is relative to the sub-frame numbering in the macro cell. In the pico cell these sub-frames may still be numbered 0 and 5.

If the macro cell uses an extended CP in a sub-frame, and the pico cell simultaneously uses a normal CP in said sub-frame, this will result in frequency domain interference. Thus, it would be beneficial if the macro cell and the pico cell were coordinated to use a CP of the same duration simultaneously, at least e.g. in sub-frames associated with fixed CP duration (for one of the cells). Thus, if the macro and pico cells use different duration CPs in their respective sub-frames associated with fixed CP duration, these sub-frames could be separated in time, as described above. Further, the macro cell and the pico cell could be coordinated such that the macro cell uses a normal CP in the sub-frames where the pico cell transmits using a fixed normal CP. Correspondingly, the pico cell could be arranged to use an extended CP in the sub-frames where the macro cell transmits using a fixed extended CP.

Herein, when referred to actions of "a cell" or related to "a cell", it is to be understood that, when appropriate, this refers to actions of, or related to, a base station such as an eNB.

In the lower part of FIG. 4 the time frequency grids of the macro and pico cells are overlaid and it is illustrated how, in order to reduce the frequency domain interference between the layers, the cells are coordinated such that both cells use extended CP in sub-frames 0 and 5 and a normal CP in sub-frames 1 and 6 (numbering relative the macro cell). Several different inter-cell interference coordination schemes could be defined in this scenario, but such methods fall outside the scope of this disclosure and are therefore not discussed further here.

As an alternative to signaling the CP duration to be used by a certain UE in certain dynamic sub-frames via RRM messages, an even more dynamic CP configuration, e.g. per OFDM symbol, could be considered. For example, if the first OFDM symbol in every sub-frame is configured for a fixed CP duration, then it would be possible to design a "CP indicator channel" in that first symbol (known to have fixed CP duration). This fixed CP should preferably be an extended CP so that also users with long time dispersion can decode this channel reliably. However, it is also possible to use a normal CP e.g. in case the channel coding is robust enough to handle the sub-carrier interference that some users with large time dispersion might experience. This CP indicator channel would be somewhat similar to the PCFICH channel that exists in LTE today but it would indicate the CP duration of the remaining OFDM symbols in the sub-frame. That is, in such a solution, the CP duration would be flexible on an OFDM-symbol level.

Further, it may be desired to apply different CP durations in Uplink (UL) and Downlink (DL). For example, in case of Hetnet, UL and DL de-coupling is often discussed, which implies e.g. that a UE is served by different base stations in the UL and DL, respectively. In such cases it may be desired to apply different values of parameters such as CP and sub-carrier spacing for the different links (UL/DL). Therefore, it could be valuable to enable that such parameters could be selected independently for UL and DL. Also so-called CoMP might be applied e.g. only for the UL and not for the DL, and in such a case it may also be beneficial and thus desired to apply different parameter values in the UL as compared to the DL. Further, the cost of having a too long CP in the UL might not be a problem if the UE is power limited. For example, when the delay-spread is small, the base station could use the received power also in parts of the CP (since the CP is composed of a part of the adjacent information and since the inter symbol interference does not corrupt the whole CP), and in that case the received energy in the non-corrupted part of the CP is not wasted. For the DL, which is seldom power limited, this is probably less interesting. That is, it may be more important to select a shorter CP in the DL whenever possible, than it is to dynamically change the CP of the UL to a shorter one whenever possible.

Different embodiments of the herein suggested technology may require some changes to various existing downlink control channels and signaling protocols. For example, according to current standard, the time between an UL grant and the corresponding UL transmission is fixed, which requires that a UE is allowed to communicate in a sub-frame a certain time period after having received an UL grant. However, when applying UE-specific CP durations, as suggested herein, all UEs may not be able to communicate in all sub-frames/OFDM symbols. Thus, it may be required to modify the signaling of UL grants to a UE, such that a variable delay between the UL grant and the UL transmission is enabled, and/or such that signaling of several UL grants at the same time is enabled, which is sometimes referred to as "UL forward scheduling".

Another modification that might be required, for similar reasons as above, relates to the ACK/NACK feedback that is associated with the UL data transmissions. This ACK/NACK signaling is transmitted in the downlink and hence some modifications to the PHICH (Physical Hybrid-ARQ Indicator CHannel), or ePHICH as the corresponding physical channel might be named in LTE Rel-12, is likely to be required. For example, some type of bundling can be considered where several ACK/NACKS corresponding to transmissions in different UL sub-frames are transmitted in one downlink sub-frame. Note that since there is also a "New data indicator" bit included in the downlink control information (DCI) which makes it possible to consider a protocol operation without a PHICH (or ePHICH) altogether.

Note however that the protocol details such as the exact method of how to provide UL grants and UL HARQ feedback to the UEs is not part of the invention and is therefore not discussed further herein.

Above, a fixed and a dynamic CP configuration have been discussed. However, the concept described above is also applicable for different sub-carrier spacings, Δf. In LTE, two different sub-carrier spacings are defined; a so-called "normal" sub-carrier spacing of 15 kHz and a so-called "narrow" sub-carrier spacing of 7.5 kHz. The sub-carrier spacing used needs to be significantly smaller than the channel coherence bandwidth. The use of a more narrow sub-carrier spacing will result in a longer symbol duration, and hence the overhead cost of a certain CP length will decrease. For example, for UEs with low mobility and high coherence bandwidth, a narrow sub-carrier spacing might be more beneficial than the normal sub-carrier spacing. Thus, the herein suggested technology can be extended to also include the sub-carrier spacing configuration. That is, some sub-frames or OFDM-symbols could be associated with a fixed sub-carrier spacing, and others be associated with a dynamic sub-carrier spacing. Thus, in the sub-frames or symbols associated with dynamic sub-carrier spacing, the sub-carrier spacing could be UE-specific, i.e. selected based on which UE or UEs that are scheduled in the symbol or sub-frame.

Exemplifying Methods in Base Station, FIGS. 5a-5d

Figure 5A:
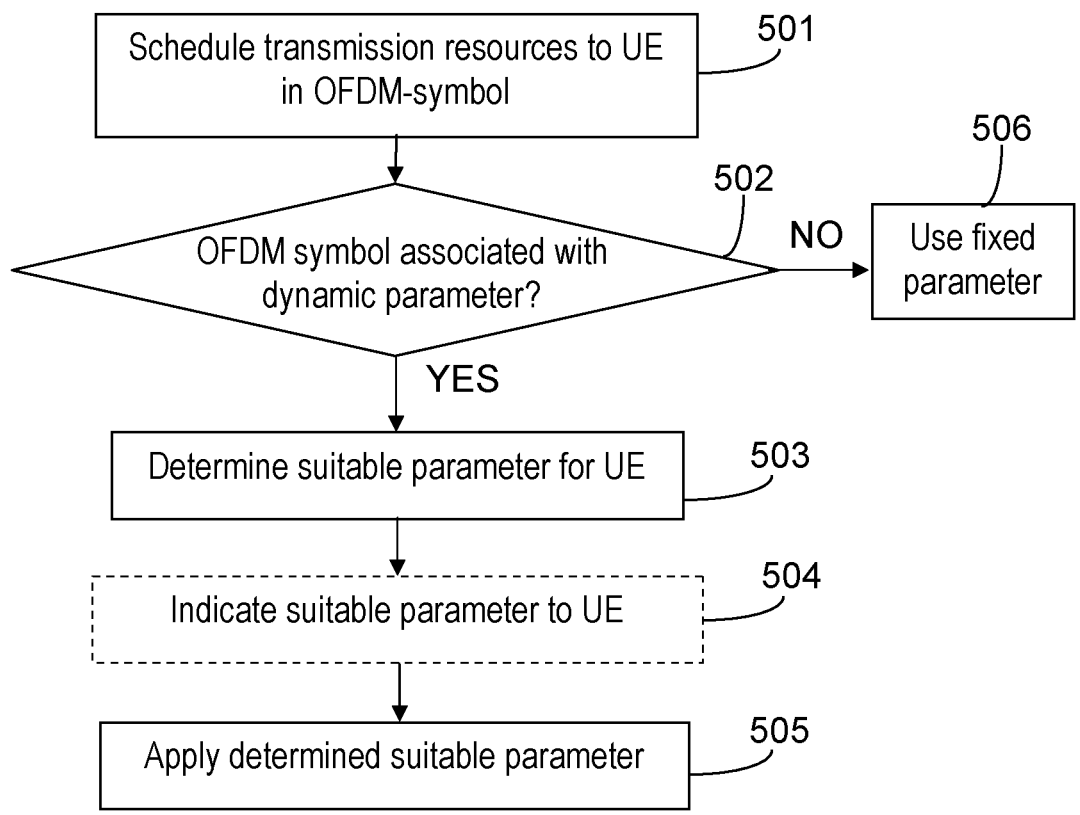
FIG. 5a shows a flow chart illustrating an exemplifying procedure in a base station according to an exemplifying embodiment.
Figure 5B:
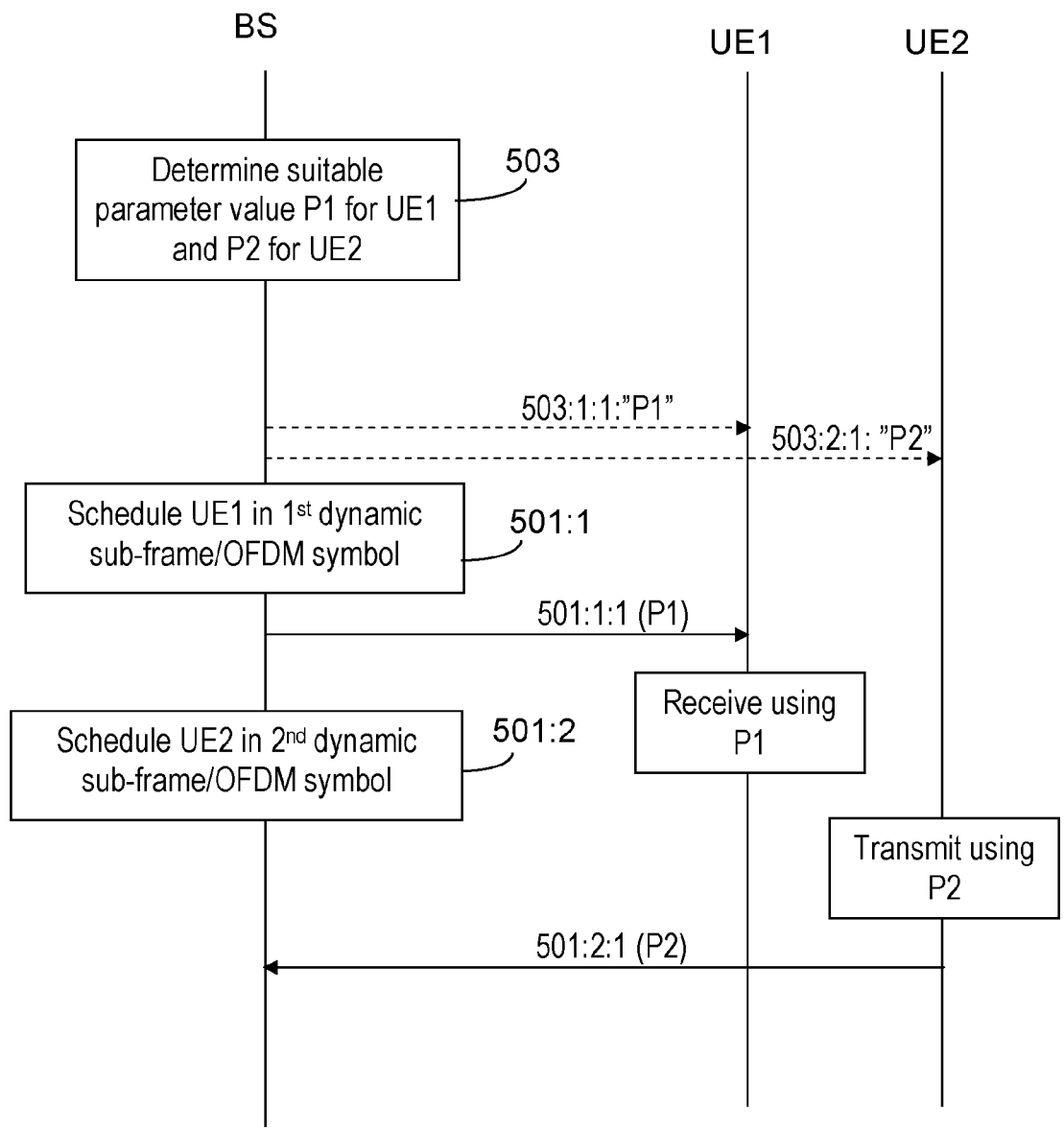

An exemplifying method performed by a base station in a wireless communication network will be described below with reference to FIG. 5a and will be further exemplified with reference to FIGS. 5b-5d. The base station is associated with a radio carrier where a radio frame comprises at least one OFDM symbol associated with a fixed parameter value and at least one OFDM symbol associated with a dynamic parameter value. Note that the method is described here on an OFDM symbol level. Alternatively, the base station could be associated with a radio carrier where a radio frame comprises at least one sub-frame associated with a fixed parameter value and at least one sub-frame associated with a dynamic parameter value, i.e. a sub-frame in which all OFDM symbols are associated with the same parameter value. The parameter is a CP, or a sub-carrier spacing, Δf. That is, the fixed and dynamic parameter values relate to the length of the CP or the magnitude (width) of the sub-carrier spacing.

The method comprises scheduling, in an action 501, UL or DL transmission resources to a UE in an OFDM symbol associated with the dynamic parameter value. When transmission resources are scheduled to the UE in an OFDM symbol associated with a fixed parameter value, the corresponding fixed parameter value is used in the communication, which is illustrated by actions 502 and 506 in FIG. 5a. When the UE has been scheduled in a dynamic OFDM symbol, a suitable value of the parameter for the UE is determined in an action 503. The determining is based on a characteristic of a radio link associated with the UE, e.g. a radio link between the base station and the UE. The radio link could be a link between multiple base stations and the UE, such as e.g. when applying CoMP for the UE. A general way of describing the radio link could be that it is associated with a physical antenna port of the network and a physical antenna port of the UE. This implies that the physical antenna port could be connected to, or otherwise associated with, multiple antenna elements and/or antenna sites.

The determining of a parameter value could involve e.g. performing measurements on signals received from the UE, and comparison of the result of the measurements with threshold values, which could represent different parameter values. The determining of a parameter value could be performed e.g. at certain time intervals; upon the receiving of an indication from a base station, or some other trigger event, such as that a determined characteristic of the radio link, such as a delay spread and/or Doppler spread, fulfills a predefined criterion e.g. a threshold value.

The characteristic/characteristics of the radio link could be represented by one or more of: a delay spread and/or a Doppler spread associated with the radio link; a CP and/or a subcarrier spacing Δf associated with another UE scheduled in the same OFDM symbol or sub-frame; and a CP and/or Δf associated with a transmission scheme associated with the UE, e.g. selected by the base station for the UE. The transmission scheme may be selected e.g. per TTI, or for some longer period. Generally, it could be said that, of the two alternatives delay spread and Doppler spread, the CP depends mostly on the delay spread while the Δf depends mostly on the Doppler spread.

The alternative of determining the parameter value based on a delay spread and/or a Doppler spread associated with the radio link may involve measuring a delay spread and/or a Doppler spread of signals received from a UE. Such measurements could, due to reciprocity of the channel, alternatively be performed in the UE, and the result be indicated to the base station.

The alternative of determining the parameter value to be used for a UE, e.g. UE_A, based on a CP and/or a subcarrier spacing Δf associated with another UE, e.g. "UE_B", scheduled in the same OFDM symbol or sub-frame may relate to the case when UE_B has been scheduled in an OFDM symbol or a sub-frame but there is still transmission resources left to be scheduled in said OFDM symbol or sub-frame. These remaining resources could then be scheduled to UE_A, given that the CP and Δf associated with the UE_B could be used also for UE_A. Since the UE_B is already scheduled in the OFDM symbol or sub-frame, the CP and/or Δf associated with UE_B are to be used in the OFDM symbol or sub-frame. This CP and/or Δf may possibly not be the optimal choice for UE_A, but in return, UE_A may get scheduled earlier than it would have been if awaiting scheduling in an OFDM symbol or sub-frame having a CP and/or Δf selected based only on UE_A. In this alternative, the parameter values associated with UE_B are assumed to be known to the base station when scheduling UE_A in the remaining resources. It may then be evaluated, e.g. based on a measured delay spread and/or Doppler spread associated with UE_A whether these parameter values could be applied also for UE_A.

The alternative of determining the parameter value based on a transmission scheme may relate to a transmission scheme involving mapping signals to and/or from physical antenna elements. That is, for example, mapping from a physical antenna port to antenna elements at multiple sites and/or to antenna elements in an antenna array. Such mapping may be performed e.g. when applying one or more of CoMP, beam forming and pre-coding. The use of a certain transmission scheme for transmission to a UE may imply that the radio link to the UE has certain characteristics in terms of e.g. delay spread, and thus requires e.g. a CP of a certain length. Information on different requirements in terms of CP and/or Δf for certain transmission schemes could be provided to and/or stored in the base station, and thus be accessible during determining of a CP and/or a sub-carrier spacing Δf.

The determined value to be used for communication with the UE in the OFDM symbol associated with the dynamic parameter value is one of at least two possible values, e.g. a so-called "normal" or "extended" CP, or, a "normal" or "narrow" sub-carrier spacing. Use of other parameter values than these standardized ones is also possible with the herein suggested technology.

Then, the determined value is applied for communication with the UE in the scheduled transmission resources in an action 505. The determined parameter is optionally indicated to the UE in an action 504 (broken outline). However, e.g. due to channel reciprocity, it would also be possible e.g. for the UE to autonomously determine which parameter value, e.g. out of a set of predefined parameter values, that currently would be suitable for communication with the base station, and then assume that this parameter will be used by the base station when communicating with the UE. The UE could determine a suitable parameter based on measurements on signals received from the base station and comparison of the result of the measurements with threshold values, which could represent different parameter values. However, such a solution, without an explicit agreement on which parameter that is to be used, may in some situations result in a discrepancy between the parameter value used by the party which is transmitting, of the base station and the UE, and the parameter value expected by the party which is receiving. This could be solved e.g. by use of blind, or partly blind, detection e.g. for verifying which parameter that is used by the base station. By partly blind detection is meant e.g. first trying the currently most probable candidate parameter value, out of a set of candidate parameter values, based on some criteria. The probability of the candidates could be determined based on channel measurements performed by the UE, as previously described.

A set of signaling schemes illustrating different embodiment of the procedure described above is shown in FIGS. 5b-5d. In these figures, two UEs, UE1 and UE2, served by a base station, BS, are illustrated. In FIG. 5b, the base station determines a suitable parameter value P1, e.g. a normal CP, for UE1 and a suitable parameter value P2, e.g. a normal or extended CP, for UE2, in an action 503. These parameter values could be determined based on, as previously stated, one or more of: a delay spread and/or a Doppler spread associated with the respective UE; a CP and/or a subcarrier spacing Δf associated with another UE scheduled in the same sub-frame or OFDM symbol; and a CP and/or Δf associated with a transmission scheme selected for the OFDM symbol. The alternatives of determining the parameter values based on a CP and/or a subcarrier spacing Δf associated with another UE scheduled in the same sub-frame or OFDM symbol are applicable e.g. when it is known which UEs that are scheduled in the same sub-frame or OFDM symbol, such as e.g. when the determining 503 is performed after the scheduling, as illustrated e.g. in FIG. 5d. The determining of P1 and P2 are illustrated as a single action 503 in FIG. 5b, but could be performed in, and illustrated as, two different actions, e.g. as 503: 1 and 503: 2 in FIG. 5d.

The determined parameter value P1 may be indicated to UE1 by an indication 503: 1: 1, and P2 may be indicated to UE2 by an indication 503: 2: 1. Alternatively, the parameter values P1 and P2 could be determined e.g. autonomously by UE1 and UE2, respectively, based e.g. on delay spread and/or Doppler spread related to the base station and the respective UE.

UE1 is scheduled transmission resources in a first OFDM symbol associated with a dynamic parameter value in an action 501: 1. Then, the base station transmits a downlink communication 501: 1: 1 to UE1 in the scheduled transmission resources using the parameter value P1. The scheduled resources are indicated to the UE (not shown) and could alternatively be associated with uplink communication. UE1 receives the communication 501: 1: 1 using the transmission parameter P1. That is, UE1 expects that the base station has used P1 for the communication, e.g. a normal CP or a certain Δf.

UE2 is scheduled transmission resources in a second OFDM symbol associated with a dynamic parameter value in an action 501: 2. When P1=P2, UE1 and UE2 could be scheduled in the same OFDM symbol. However, when P1≠P2, UE1 and UE2 should preferably not be scheduled in the same OFDM symbol, since use of different CP durations and/or sub-carrier spacing within an OFDM symbol (or other structural frame element associated with a certain CP duration) leads to interference, as previously described. In this example, the transmission resources scheduled to UE2 are uplink transmission resources. The scheduled resources are indicated to the UE (not shown) and could alternatively be associated with downlink communication. UE2 transmits an uplink communication to the base station using P2, e.g. an extended CP. The base station receives the communication expecting it to be transmitted using P2.

Figure 5C:
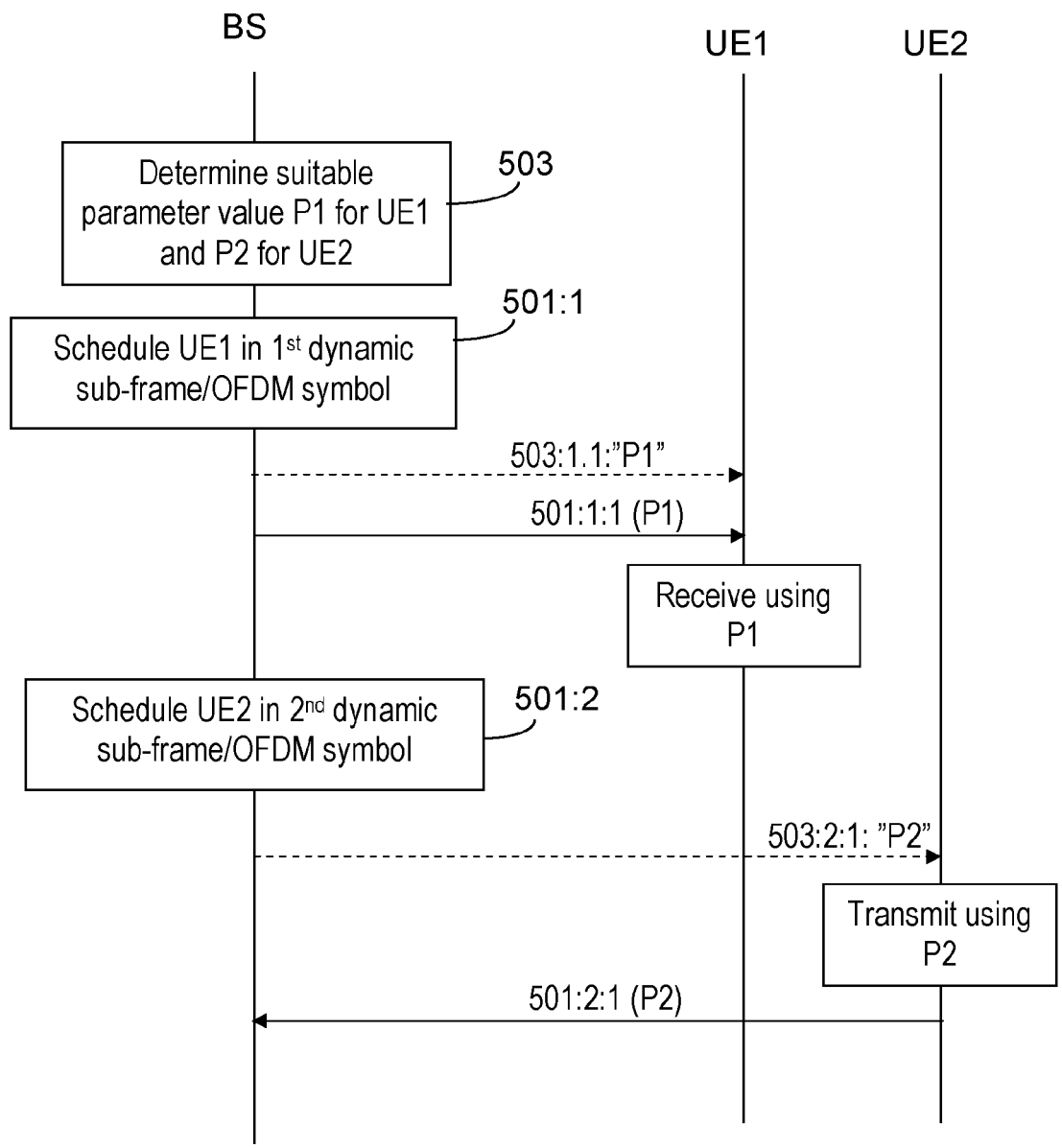
Figure 5D:
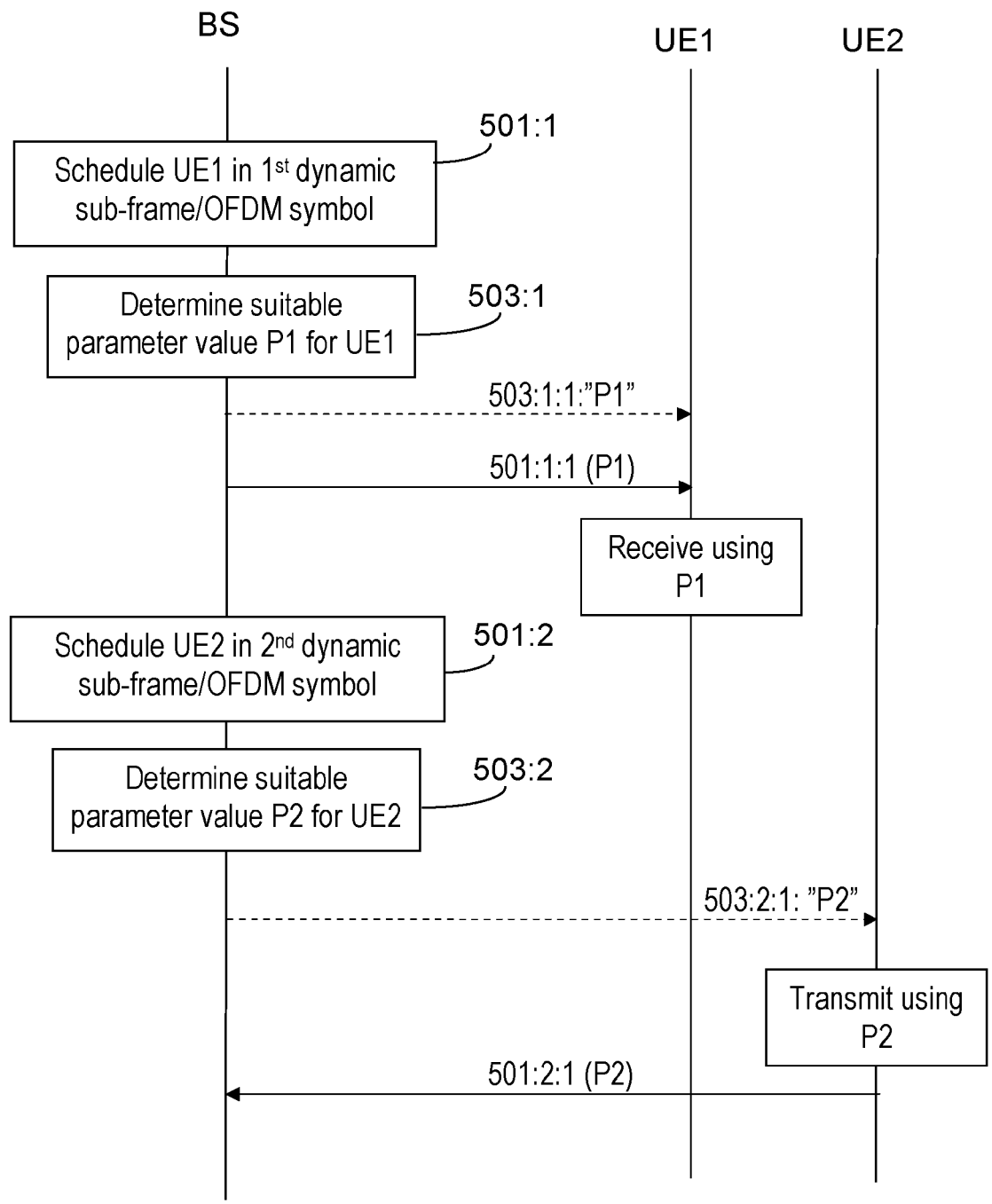

FIG. 5c shows yet a variant of when parameters may be indicated to the UEs in relation to the scheduling. In FIG. 5c, the parameters are determined in action 503, but indicated to the UEs after the scheduling 501: 1 and 501: 2, respectively.

Figure 7:
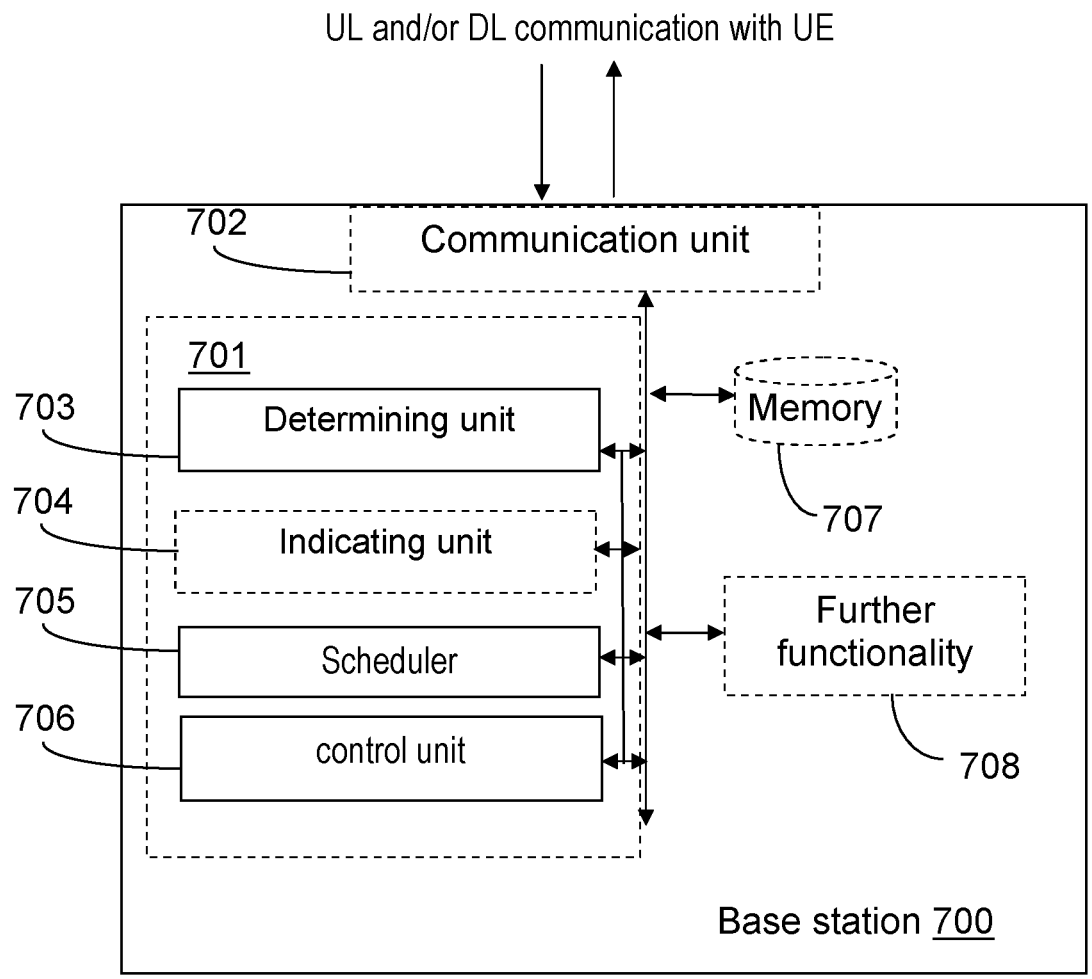
FIG. 7 is a block chart illustrating a base station according to an exemplifying embodiment.

Exemplifying Base Station, FIG. 7

Below, an exemplifying base station 700, such as an eNB, which is adapted to enable the performance of the above described procedure will be described with reference to FIG. 7. The base station 700 is operable to be associated with a carrier where a radio frame comprises at least one OFDM symbol associated with a fixed parameter value and at least one OFDM symbol associated with a dynamic parameter value. The parameter is a Cyclic Prefix, CP, or a subcarrier spacing, $\Delta f$.

The base station 700 is illustrated as to communicate with other entities via a communication unit 702, which may be considered to comprise means for wireless uplink and downlink communication. Parts of the base station which are adapted to enable the performance of the above described procedure are illustrated as an arrangement 701, surrounded by a dashed line. The arrangement and/or base station may further comprise other functional units 708, for providing e.g. regular base station functions, such as signal processing. The arrangement and/or base station may further comprise one or more storage units 707.

The arrangement 701 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIGS. 5a-5d.

The arrangement part of the base station may be implemented and/or described as follows:

The base station comprises a scheduler 705, operable to schedule transmission resources to a UE in an OFDM symbol associated with the dynamic parameter value. The base station further comprises a determining unit 703, adapted to determine a value of the parameter for the UE based on a characteristic of a radio link associated with the UE. The determined value is one of at least two possible values for the parameter. The base station further comprises a control unit 706, adapted to apply the determined value of the parameter for communication with the UE in the scheduled transmission resources.

Figure 6A:
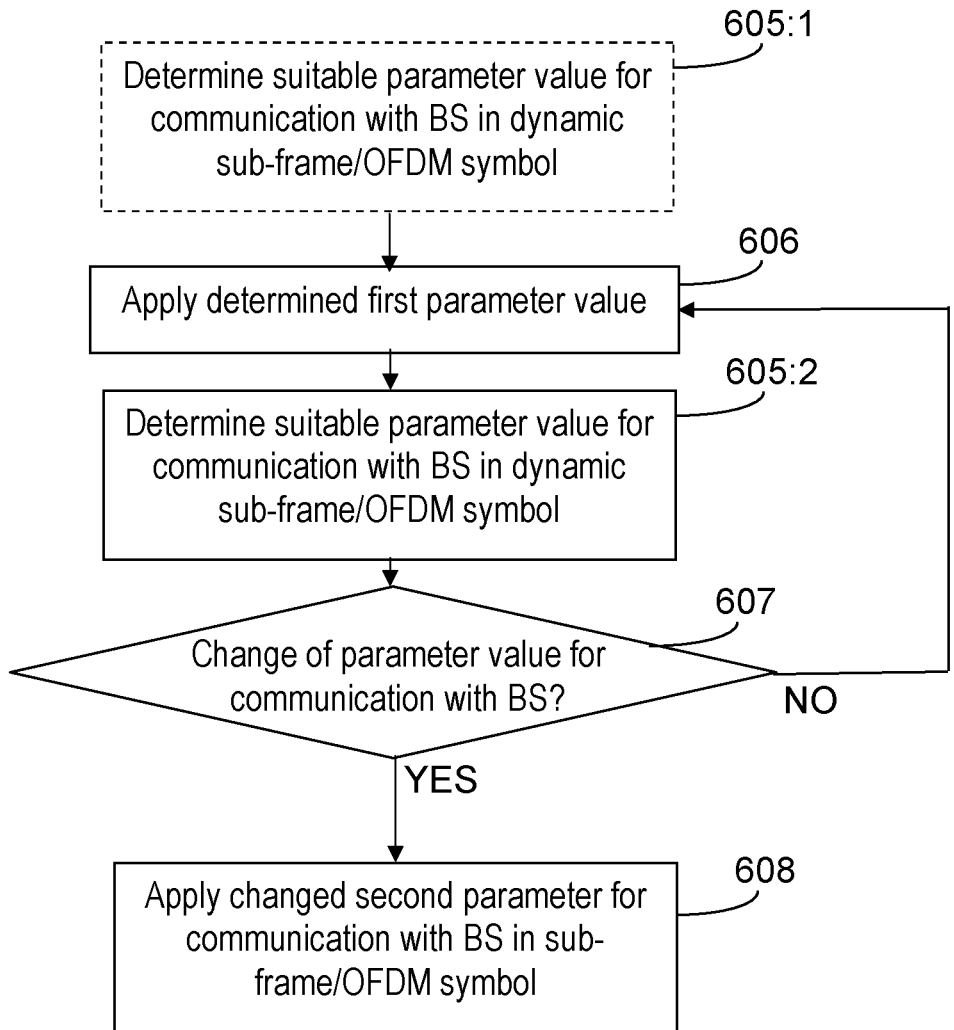
FIGS. 6a and 6b are flow charts illustrating exemplifying procedures according to exemplifying embodiments.
Figure 6B:
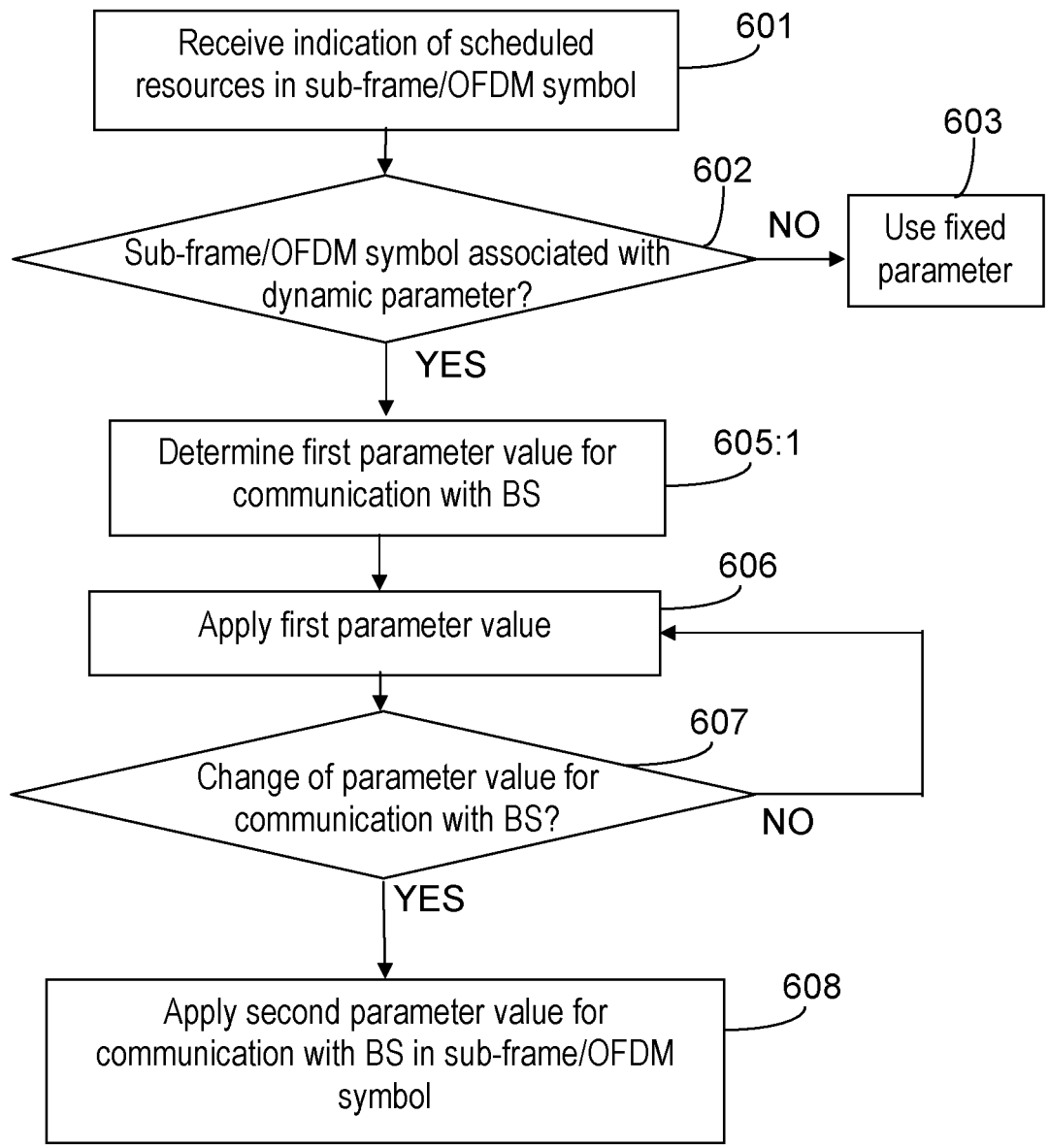

Exemplifying Method in UE, FIGS. 6a and 6b

An exemplifying method performed by a UE in a wireless communication network will be described below with reference to FIGS. 6a and 6b. The UE is assumed to be served, in the uplink and/or downlink, by a base station associated with a carrier where a radio frame comprises at least one OFDM symbol associated with a fixed parameter value and at least one OFDM symbol associated with a dynamic parameter value, where the parameter is a CP, or a sub-carrier spacing, $\Delta f$. That is, the fixed and dynamic parameter values relate to the length of the CP or the magnitude (width) of the sub-carrier spacing.

The method illustrated in FIG. 6a comprises applying a first parameter value, in an action 606, for communication with the base station in a first OFDM symbol, which OFDM symbol is associated with the dynamic parameter value. In FIG. 6a and in FIG. 6b, the determining of the first parameter value, based on at least one of the features listed below, is illustrated as action 605: 1.

The method illustrated in FIG. 6a further comprises determining a parameter value for communication with the base station based on an indication from the base station (cf e.g. indication 503: 1: 1 in FIG. 5a) and/or a characteristic of a radio link associated with the UE. The radio link could be a link between multiple base stations and the UE, such as e.g. when applying CoMP. A general way of describing the radio link could be that it is associated with a physical antenna port of the network and a physical antenna port of the UE. This implies that the physical antenna port could be connected to, or otherwise associated with, multiple antenna elements and/or antenna sites. Such determining of a parameter value could be performed e.g. at certain time intervals; upon the receiving of an indication from a base station, or some other trigger event, such as that a determined delay spread and/or Doppler spread fulfills a predefined criterion e.g. a threshold value.

The characteristic of the radio link could be represented by (as previously described in conjunction with embodiments of the method performed by the base station) e.g. one or more of a delay spread and/or Doppler spread associated with the radio link; a CP and/or $\Delta f$ associated with another UE scheduled in the same sub-frame or OFDM symbol; a CP and/or $\Delta f$ associated with a transmission scheme associated with the UE, e.g. a transmission scheme selected for the UE for a TTI or a longer time period. For example, the delay spread and/or Doppler spread associated with a radio link between at least one base station and the UE. For example, a delay spread and/or Doppler spread could be determined by the UE based on measurements on signals received from the base station. Any of the different alternatives could be indicated to the UE by the base station, such as e.g. the transmission scheme to be used. Alternatively, the parameter to be used could be determined in the base station and be indicated to the UE by the base station.

FIG. 6a further illustrates that a second parameter value is determined in an action 605: 2. Such determining may be performed e.g. at certain time intervals; upon the receiving of an indication from a base station, or some other trigger event, such as that a determined characteristic of the radio link, such as a delay spread and/or Doppler spread, fulfills a predefined criterion e.g. a threshold value. When a determined second parameter value fulfills a criterion in relation to the first parameter value, e.g. differs from the first parameter value more than a predefined threshold value, this determined second parameter value is applied, in an action 608, instead of the first parameter value, when communicating with the base station in a second OFDM symbol associated with the dynamic parameter value. For example, the first parameter value could be an extended CP and the second parameter value could be a normal CP, or vice versa. That is, the first parameter value is applied for communication as long as no change of the parameter value is triggered (due to that a second determined parameter value fulfills a criterion), e.g. in an action 607.

In FIG. 6b, it is illustrated that an indication of resources allocated to the UE is received in an action 601. The resources may be related to uplink or downlink communication and may have been allocated in an OFDM symbol/sub-frame associated with a fixed parameter value, or in an OFDM symbol/sub-frame associated with a dynamic parameter value. Whether the OFDM symbol is associated with one or the other (fixed/dynamic) may e.g. be explicitly or implicitly indicated by the base station, or follow a predefined scheme communicated to the UE at some point. The determining of whether the OFDM symbol/sub-frame is associated with a fixed or dynamic parameter value is illustrated as an action 602.

A first parameter value is determined in an action 605: 1 based on an indication from the base station or on the characteristic of a radio link, as previously described. Said first parameter is applied for communication with the base station, which is illustrated as an action 606. Further, a second parameter value is determined, e.g. at certain time intervals or upon some other triggering event, in an action 607 (cf. 605: 2 in FIG. 6a). If the second parameter value fulfills a criterion in relation to the first parameter value, it is applied for communication with the base station in resources scheduled to the UE, in an action 608, and if not, the first parameter is still valid for communication with the base station in new allocated resources.

It should be noted that the flow chart illustrated in FIG. 6b is schematic, and does not necessarily illustrate all actions, but should serve to provide a better understanding of the technology suggested herein. For example, indications of scheduled resources may be assumed to be received more than once during the process.

Figure 8:
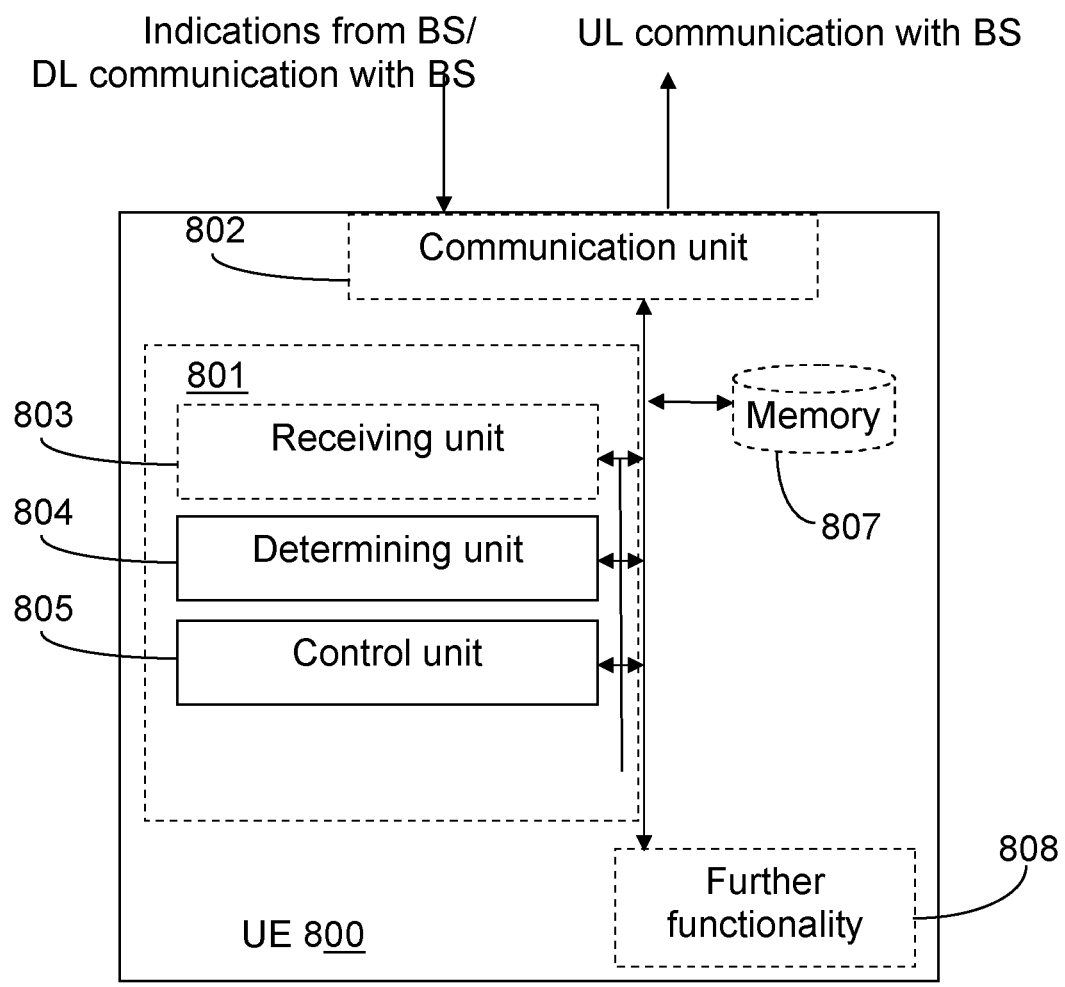
FIG. 8 is a block chart illustrating a UE according to an exemplifying embodiment.

Exemplifying UE, FIG. 8

Below, an exemplifying UE 800, which is adapted to enable the performance of the above described procedure, will be described with reference to FIG. 8. The UE 800 is operable to be served by a base station associated with a carrier where a radio frame comprises at least one OFDM symbol associated with a fixed parameter value and at least one OFDM symbol associated with a dynamic parameter value. The parameter is a Cyclic Prefix, CP, or a subcarrier spacing, $\Delta f$.

The UE 800 is illustrated as to communicate with other entities via a communication unit 802, which may be considered to comprise means for wireless uplink and downlink communication. Parts of the UE which are adapted to enable the performance of the above described procedure are illustrated as an arrangement 801, surrounded by a dashed line. The arrangement and/or UE may further comprise other functional units 808, for providing e.g. regular UE functions, such as signal processing. The arrangement and/or UE may further comprise one or more storage units 807.

The arrangement 801 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIGS. 6a and 6b.

The arrangement part of the base station may be implemented and/or described as follows:

The UE comprises a control unit 805 adapted to apply a first parameter value for communication with the base station in a first OFDM symbol associated with the dynamic parameter value. The UE further comprises a determining unit 804, adapted to determine a parameter value for communication with the base station based on one or more of: an indication from the base station and a characteristic of a radio link associated with the UE. The control unit 805 is further adapted to, when a determined second parameter value fulfills a criterion in relation to the first parameter value, apply the second parameter value when communicating with the base station in a second OFDM symbol associated with the dynamic parameter value.

Figure 9:
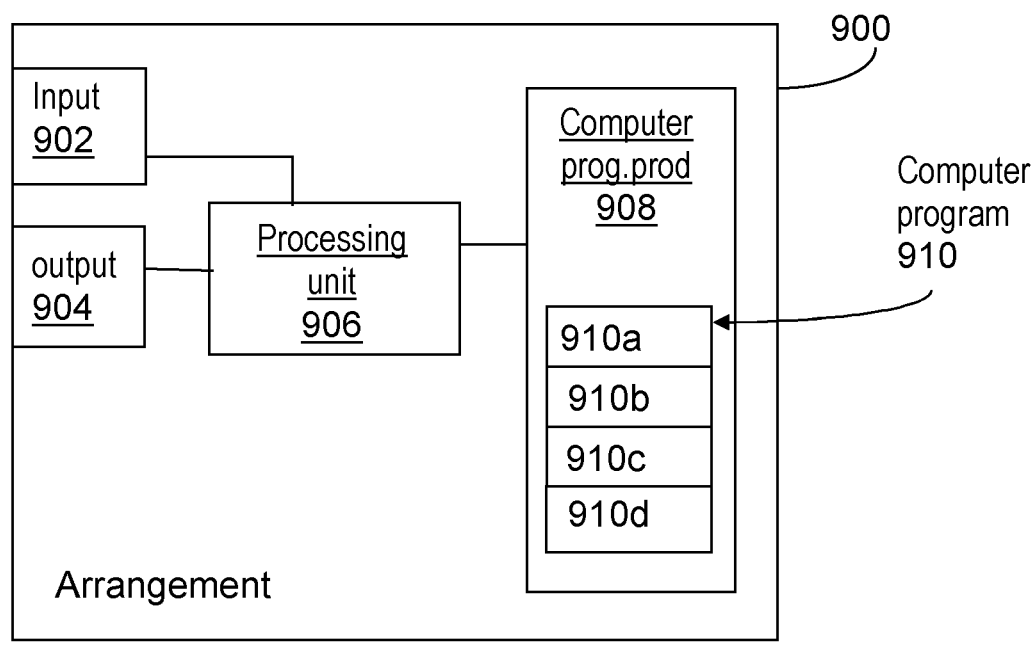
FIG. 9 is a block chart illustrating an exemplifying computer implemented embodiment of an arrangement for use in a base station.

Exemplifying Computer Implemented Embodiment, FIG. 9.

FIG. 9 schematically shows a possible embodiment of an arrangement 900, which also can be an alternative way of disclosing an embodiment of the arrangement illustrated in FIG. 7. Comprised in the arrangement 900 are here a processing unit 906, e.g. with a DSP (Digital Signal Processor). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity.

Furthermore, the arrangement 900 comprises at least one computer program product 908 in the form of a non-volatile or volatile memory, e.g. an EEPROM (Electrically Erasable Programmable Read-Only Memory), a flash memory and/or a hard drive. The computer program product 908 comprises a computer program 910, which comprises code means, which when executed in the processing unit 906 in the arrangement 900 causes the arrangement and/or a node in which the arrangement is comprised to perform the actions e.g. of the procedures described earlier in conjunction with FIG. 5a-5d.

The computer program 910 may be configured as a computer program code structured in computer program modules. Hence, in an exemplifying embodiment for use in a base station, the code means in the computer program 910 of the arrangement 900 may comprise a scheduling module 910a for scheduling transmission resources to a UE. The computer program 910 may further comprise a determining module 910b, for determining a value of a parameter (CP and/or $\Delta f$) for the UE based on a characteristic of a radio link associated with the UE. The computer program 910 may further comprise a control module 910c, for applying the determined value of the parameter when communicating with the UE in the scheduled transmission resources. The computer program may further comprise additional computer program modules 910d, adapted to provide some or all of the different actions of the embodiments described above in conjunction with the procedure in a base station.

A corresponding arrangement in a UE could be described in a similar manner, with the necessary changes made, which changes may be derived from other parts of this document.

The modules 910a-c could essentially perform the actions of the flow illustrated in FIG. 5 and could replace the arrangement 701 illustrated in FIG. 7.

Although the code means in the embodiment disclosed above in conjunction with FIG. 9 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node or within the UE.

The above description of various embodiments of the herein suggested technology, while not limited to use in LTE systems, should be read and understood in the context of the existing 3GPP standards and revisions thereto, and should be understood to reflect adaptations of well-known physical structures and devices to carry out the described techniques.

Examples of several embodiments of the herein suggested technology have been described in detail above. Those skilled in the art will appreciate that the herein suggested technology can be implemented in other ways than those specifically set forth herein, without departing from essential characteristics of the suggested technology.

The solution suggested by the inventors is herein mostly described in terms of LTE. It should, however, be noted that the general concepts of the solution are applicable also at least in other systems having similar characteristics in terms e.g. of frame structure.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

3GPP 3$^{rd}$ Generation Partnership Project
BS Base Station, e.g. eNB
CP Cyclic Prefix
CoMP Coordinated Multi-Point transmission
DCI Downlink Control Information
eNB evolved (E-UTRAN) NodeB
LTE Long Term Evolution
MBS Multi-cast and Broadcast Services
MBSFN Multi-cast Broadcast Single Frequency Network
PDCCH Physical Downlink Control Channel
PHICH Physical Hybrid-ARQ Indicator CHannel
RRC Radio Resource Control
RRM Radio Resource Management
SFN Single Frequency Network
UE User Equipment

The invention claimed is:

1. A method performed by a base station in a wireless communication network, the base station being associated with a carrier where a radio frame comprises at least one OFDM symbol associated with a fixed parameter value and at least one OFDM symbol associated with a dynamic parameter value, the method comprising:
scheduling transmission resources to a UE in a first OFDM symbol and a second OFDM symbol associated with the dynamic parameter value;
determining a first value of the dynamic parameter value for communicating with the UE in the first OFDM symbol;
applying the first value of the dynamic parameter value when communicating with the UE in the first OFDM symbol associated with the dynamic parameter value;
determining a second value of the dynamic parameter value for communicating with the UE in the second OFDM symbol associated with the dynamic parameter value, the second value of the dynamic parameter value selected individually for the UE which fulfils a criterion in relation to the first value, the second value based on a characteristic of a radio link associated with the UE, and
applying the second value of the dynamic parameter value when communicating with the UE in the second OFDM symbol associated with the dynamic parameter value, and
wherein the dynamic parameter value is a cyclic prefix (CP) or a subcarrier spacing ($\Delta f$).

2. The method according to claim 1, further comprising: indicating the second value of the dynamic parameter value to the UE.

3. The method according to claim 1, wherein the characteristic of the radio link is represented by one or more of:
a delay spread;
a Doppler spread;
a CP associated with another UE scheduled in the same sub-frame;
a $\Delta f$ associated with another UE scheduled in the same sub-frame; and
at least one of a CP and $\Delta f$ associated with a transmission scheme associated with the UE.

4. The method according to claim 3, wherein the transmission scheme involves mapping signals to and/or from physical antenna elements.

5. The method according to claim 1, further comprising:
determining the characteristic of the radio link associated with the UE by one or more of:
measuring a delay spread associated with signals received from the UE;
measuring a Doppler spread associated with signals received from the UE;
identifying a parameter value that has been determined for another UE scheduled in the same sub-frame; and
identifying a transmission scheme that has been selected for the UE.

6. The method according to claim 1, wherein the radio link associated with the UE is, at least partly, a link associated with a physical antenna port of the network and a physical antenna port of the UE.

7. The method according to claim 1, wherein the dynamic parameter value is a CP and the determining of the second value of the dynamic parameter value for the UE is based on one or more of:
a delay spread associated with the radio link;
a CP associated with another UE scheduled in the same sub-frame; and
a CP associated with a transmission scheme associated with the UE.

8. The method according to claim 1, wherein the dynamic parameter value is a subcarrier spacing, $\Delta f$, and the determining of the second value of the dynamic parameter value for the UE is based on one or more of:
a Doppler spread associated with radio link;
a $\Delta f$ associated with another UE scheduled in the same sub-frame; and
a $\Delta f$ associated with a transmission scheme associated with the UE.

9. The method according to claim 1, wherein the determining of the second value of the dynamic parameter value for the UE is performed independently for uplink and downlink communication.

10. A base station in a wireless communication network, the base station being operable to be associated with a carrier where a radio frame comprises at least one OFDM symbol associated with a fixed parameter value and at least one OFDM symbol associated with a dynamic parameter value, the base station comprising:
   a memory storing instructions; and
   a processor operable to execute the instructions to cause the processor to:
      schedule transmission resources to a UE in a first OFDM symbol and a second OFDM symbol associated with the dynamic parameter value;
      determine a first value of the dynamic parameter value for communicating with the UE in the first OFDM symbol;
      apply the first value of the dynamic parameter value when communicating with the UE in the first OFDM symbol associated with the dynamic parameter value;
      determine a second value of the dynamic parameter value for communicating with the UE in the second OFDM symbol associated with the dynamic parameter value, the second value of the dynamic parameter value selected individually for the UE which fulfils a criterion in relation to the first value, the second value based on a characteristic of a radio link associated with the UE; and
      apply the second value of the dynamic parameter value when communicating with the UE in the second OFDM symbol associated with the dynamic parameter value, and
   wherein the dynamic parameter value is a cyclic prefix (CP) or a subcarrier spacing ($\Delta f$).

11. A base station according to claim 10, wherein the processor is further operable execute the instructions to cause the processor to indicate the second value of the dynamic parameter value to the UE.

12. The base station according to claim 10, wherein the characteristic of the radio link is represented by one or more of:
   a delay spread;
   a Doppler spread;
   a CP associated with another UE scheduled in the same sub-frame;
   a $\Delta f$ associated with another UE scheduled in the same sub-frame; and
   at least one of a CP and $\Delta f$ associated with a transmission scheme associated with the UE.

13. The base station according to claim 12, wherein the transmission scheme involves mapping signals to and/or from physical antenna elements.

14. The base station according to claim 10, wherein the processor is further operable to execute the instructions to cause the processor to:
   determine the characteristic of the radio link associated with the UE by one or more of:
   measuring a delay spread associated with signals received from the UE;
   measuring a Doppler spread associated with signals received from the UE;
   identifying a parameter value that has been determined for another UE scheduled in the same sub-frame; and
   identifying a transmission scheme that has been selected for the UE.

15. The base station according to claim 10, wherein the radio link associated with the UE is, at least partly, a link associated with a physical antenna port of the network and a physical antenna port of the UE.

16. The base station according to claim 10, wherein the dynamic parameter value is a CP and the second value of the dynamic parameter value for the UE is determined based on one or more of:
   a delay spread associated with the radio link;
   a CP associated with another UE scheduled in the same sub-frame; and
   a CP associated with a transmission scheme associated with the UE.

17. The base station according to claim 10, wherein the dynamic parameter value is a sub-carrier spacing, $\Delta f$, and the second value of the dynamic parameter value for the UE is determined based on one or more of:
   a Doppler spread associated with the radio link;
   a $\Delta f$ associated with another UE scheduled in the same sub-frame; and
   a $\Delta f$ associated with a transmission scheme associated with the UE.

18. The base station according to claim 10, wherein the determining of the second value of the dynamic parameter value is performed independently for uplink and downlink communication.

19. A method performed by a User Equipment (UE) in a wireless communication network, the UE being served by a base station associated with a carrier where a radio frame comprises at least one OFDM symbol associated with a fixed parameter value and at least one OFDM symbol associated with a dynamic parameter value, the method comprising:
   receiving a schedule of transmission resources in a first OFDM symbol and a second OFDM symbol associated with the dynamic parameter value;
   determining a first value of the dynamic parameter value for communicating with the base station in the first OFDM symbol;
   applying the first value when communicating with the base station in the first OFDM symbol associated with the dynamic parameter value, wherein the dynamic parameter value is a Cyclic Prefix (CP) or a subcarrier spacing ($\Delta f$);
   determining a second value for communication with the base station in the second OFDM symbol, the second value of the dynamic parameter value selected individually for the UE based on one or more of:
   an indication from the base station; and
   a characteristic of a radio link associated with the UE, and,
   in response to the second parameter value which fulfils a criterion in relation to the first value, applying the second value when communicating with the base station in the second OFDM symbol associated with the dynamic parameter value.

20. The method according to claim 19, further comprising:
   receiving an indication of the second value from the base station.

21. The method according to claim 19, wherein the characteristic of the radio link is represented by one or more of:
   a delay spread;
   a Doppler spread;

a CP associated with another UE scheduled in the same sub-frame;
a Δf associated with another UE scheduled in the same sub-frame; and
at least one of a CP and Δf associated with a transmission scheme associated with the UE.

22. The method according to claim 19, wherein the dynamic parameter value is a CP and the determining of the second value is based on one or more of:
a delay spread associated with the radio link;
a CP associated with another UE scheduled in the same sub-frame; and
a CP associated with a transmission scheme associated with the UE.

23. The method according to claim 19, wherein the dynamic parameter value is a Δf and the determining of the second value is based on one or more of:
a Doppler spread associated with the radio link;
a Δf associated with another UE scheduled in the same sub-frame; and
a Δf associated with a transmission scheme associated with the UE.

24. The method according to claim 19, wherein the determining of the second value is performed independently for uplink and downlink communication.

25. A User Equipment (UE) in a wireless communication network, the UE being operable to be served by a base station associated with a carrier where a radio frame comprises at least one OFDM symbol associated with a fixed parameter value and at least one OFDM symbol associated with a dynamic parameter value, the UE comprising:
a memory storing instructions; and
a processor operable to execute the instructions to cause the processor to:
receive a schedule of transmission resources in a first OFDM symbol and a second OFDM symbol associated with the dynamic parameter value;
determine a first value of the dynamic parameter value for communicating with the base station in the first OFDM symbol;
apply the first value when communicating with the base station in the first OFDM symbol associated with the dynamic parameter value, wherein the dynamic parameter value is a Cyclic Prefix (CP) or a subcarrier spacing (Δf);
determine a second value for communication with the base station in the second OFDM symbol, the second parameter value selected individually for the UE based on one or more of:
an indication from the base station; and
a characteristic of a radio link associated with the UE;
in response to the second parameter value which fulfils a criterion in relation to the first value, apply the second value when communicating with the base station in the second OFDM symbol associated with the dynamic parameter value.

26. A UE according to claim 25, further comprising:
a receiver operable to receive an indication of the second value from the base station.

27. A UE according to claim 25, wherein the characteristic of the radio link is represented by one or more of:
a delay spread;
a Doppler spread;
a CP associated with another UE scheduled in the same sub-frame;
a Δf associated with another UE scheduled in the same sub-frame; and
at least one of a CP and Δf associated with a transmission scheme associated with the UE.

28. A UE according to claim 25, wherein the dynamic parameter value is a CP and the determining of the second value is radio link station based on one or more of;
a delay spread associated with the radio link;
a CP associated with another UE scheduled in the same sub-frame; and
a CP associated with a transmission scheme associated with the UE.

29. A UE according to claim 25, wherein the dynamic parameter value is a Δf and the determining of the second value is based on one or more of:
a Doppler spread associated with the radio link;
a Δf associated with another UE scheduled in the same sub-frame; and
a Δf associated with a transmission scheme associated with the UE.

30. A UE according to claim 25, wherein the determining of the second value is performed independently for uplink and downlink communication.

* * * * *